United States Patent
Ota et al.

(10) Patent No.: US 7,317,055 B2
(45) Date of Patent: Jan. 8, 2008

(54) ADHESIVE RESIN AND ADHESIVE RESIN COMPOSITION FOR LIQUID CRYSTALLINE POLYMER

(75) Inventors: Seiji Ota, Sodegaura (JP); Kazuo Toyota, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 437 days.

(21) Appl. No.: 10/508,125

(22) PCT Filed: Mar. 14, 2003

(86) PCT No.: PCT/JP03/03063

§ 371 (c)(1),
(2), (4) Date: Sep. 17, 2004

(87) PCT Pub. No.: WO03/078488

PCT Pub. Date: Sep. 25, 2003

(65) Prior Publication Data

US 2005/0142303 A1    Jun. 30, 2005

(30) Foreign Application Priority Data

Mar. 18, 2002  (JP) .............................. 2002-073518

(51) Int. Cl.
C08F 255/02 (2006.01)
C09J 163/10 (2006.01)

(52) U.S. Cl. ..................... 525/242; 525/256; 156/330

(58) Field of Classification Search ........... 255/299.01; 525/74, 284, 286, 289, 242, 256; 156/330, 156/334
See application file for complete search history.

(56) References Cited

FOREIGN PATENT DOCUMENTS

| CN | 1283642 A | 2/2001 |
|---|---|---|
| JP | 6-172459 A | 6/1994 |
| JP | 7-258355 | * 10/1995 |
| JP | 8-283353 A | 10/1996 |
| JP | 9-3138 A | 1/1997 |
| JP | 2002-167412 A | 6/2002 |
| JP | 2002-212240 A | 7/2002 |

OTHER PUBLICATIONS

English abstract for JP 7-258355.*

* cited by examiner

*Primary Examiner*—Shean C Wu
(74) *Attorney, Agent, or Firm*—Buchanan Ingersoll & Rooney PC

(57) ABSTRACT

An adhesive resin for a liquid crystal polymer, comprising a modified polyolefin (D) prepared by graft polymerizing at least one epoxy group-containing ethylenically unsaturated monomer (B) to a polyolefin (A) obtained by polymerizing one or more olefins selected from ethylene and α-olefin having from 3 to 20 carbon atoms, in an amount in the range of from 0.01 to 50% by weight, with the proviso that the modified polyolefin is 100% by weight. The modified polyolefin (D) can be combined with a thermoplastic resin (E) to form an adhesive resin composition.

12 Claims, No Drawings

ADHESIVE RESIN AND ADHESIVE RESIN COMPOSITION FOR LIQUID CRYSTALLINE POLYMER

TECHNICAL FIELD

The present invention relates to an adhesive resin and an adhesive resin composition used for a liquid crystal polymer.

BACKGROUND ART

In general, polyolefins are characterized by excellent properties in moldability, thermal resistance, mechanical characteristics, hygienic adaptability, and steam permeation resistance, and with excellent appearance as molded articles. Therefore, they are widely used in extrusion molded articles, blow molded articles, injection molded articles, etc.

However, since the polyolefins are so-called non-polar resins without polar groups in the molecule, they are poor in the affinity with various polar materials including metals, and have difficulties in laminating and using these materials.

Thus, improvement of the affinity with polar materials by graft polymerization of maleic anhydride to the polylolefins has widely been used, but the improvement for some adherends is sometimes inadequate, hence a modified polyolefin having higher adhesive force to polar materials is desired.

On the other hand, liquid crystal (hereafter referred to as LC) polymers including all the aromatic polyesters have excellent chemical resistance and gas barrier properties, and application to packaging materials for vessels, gasoline tanks of automobiles, etc. has been expected. However, the LC polymer in general has properties of high tendency for orientation in the direction of flow at melting, and hence has high strength in the molding direction but low strength in the direction perpendicular to molding. Also, because the LC polymers are expensive, it is necessary to use them by laminating with polymers such as the polyolefins.

Adhesiveness between the LC polymers and the polyolefins in conventional thermal fusion is poor, and certain adhesive resins are necessary to laminate them.

Various investigations have so far been performed on the adhesive resins for the LC polymers and the polyolefins. These adhesive resins are mainly copolymers manufactured by radical copolymerization of ethylene and a polar monomer such as (meth)acrylic acid under high pressure. Since many long-chain branches are formed in a polymerization reaction, copolymers with high crystallinity are difficult to be manufactured; hence there were cases in which the adhesive strength is extremely decreased when the copolymers were applied to usage in direct contact with a solvent such as gasoline or to usage for fatty food materials.

DISCLOSURE OF INVENTION

The present inventors, in consideration of these conventional technologies, have conducted extensive investigations and as a result found that a polyolefin wherein specific ethylenically unsaturated monomers are graft polymerized has excellent adhesiveness to the LC polymer and excellent solvent resistance. Based on these findings the present invention has been completed.

An object of the present invention is to provide an adhesive resin and an adhesive resin composition that have excellent adhesiveness to the LC polymer and excellent solvent resistance.

The adhesive resin for the LC polymer according to the present invention is characterized by comprising:

a modified polyolefin (D) prepared by graft polymerizing at least one epoxy group-containing ethylenically unsaturated monomer (B) to a polyolefin (A) obtained by polymerizing one or more olefins selected from ethylene and α-olefin having from 3 to 20 carbon atoms, in an amount in the range of from 0.01 to 50% by weight, with the proviso that the modified polyolefin is 100% by weight.

Examples of the modified polyolefin (D) include a modified polyolefin (D-1) and a modified polyolefin (D-2) to be described later. The modified polyolefin (D-1) is preferably a modified polyolefin (d-1) to be described later.

Also, the adhesive resin composition for the LC polymer according to the present invention is characterized by comprising a modified polyolefin (D) prepared by graft polymerizing at least one an epoxy group-containing ethylenically unsaturated monomer (B) to a polyolefin (A) obtained by polymerizing one or more kinds of olefins selected from ethylene and α-olefin having from 3 to 20 carbon atoms, in an amount in the range of from 0.01 to 50% by weight, with the proviso that the modified polyolefin is 100% by weight; and a thermoplastic resin (E).

BEST MODE FOR CARRAYING OUT THE INVENTION

Next, the adhesive resin and the composition for the LC polymer comprising the same according to the present invention will be specifically described.

(Polyolefin (A))

The polyolefin (A) to be used in the present invention is obtained by polymerizing at least one olefin selected from ethylene and α-olefin having from 3 to 20 carbon atoms.

Specific examples include α-olefin having from 3 to 20 carbon atoms, such as propylene, 1-butene, 2-butene, 1-pentene, 3-methyl-1-butene, 1-hexene, 4-methyl-1-pentene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene, and 1-eicosene, in addition to ethylene. Homopolymers or copolymers thereof can be used alone or in combination with several kinds.

Among them, the polyolefin (A) containing polymers or copolymers obtained from one or more kinds of olefins selected from ethylene, propylene, 1-butene, 4-methyl-1-pentene, 1-hexene, and 1-octene is preferable.

Among them, the polyolefin (A) containing an ethylene homopolymer (A-1) or a copolymer (A-2) of ethylene and at least one olefin selected from α-olefin having from 3 to 20 carbon atoms is more preferable. Herein, as for α-olefins to be copolymerized with ethylene, propylene, 1-butene, 4-methyl-1-pentene, 1-hexene and 1-octene are particularly preferable.

In the case where an ethylene-based copolymer is used as the polyolefin (A), the content of ethylene is usually 83 mole % or more, preferably 95 mole % or more, and more preferably 97 mole % or more.

The density of the polyolefin (A) used in the present invention is usually 0.895 g/cc or more, preferably 0.900 g/cc or more, more preferably 0.905 g/cc or more, and most preferably 0.910 g/cc or more, in viewing of obtaining the modified polyolefin having an excellent balance between adhesiveness to the LC polymer and solvent resistance.

The melt flow rate (MFR; ASTM D 1238, at 190° C. under a load of 2.16 kg) of the polyolefin (A) is usually in the range of from 0.01 to 500 g/10 minutes, preferably from 0.05 to 200 g/10 minutes, and more preferably from 0.1 to 100 g/10 minutes.

The crystallinity of the polyolefin (A) is usually 10% or more, preferably 25% or more, and more preferably 35% or more.

Also, the weight average molecular weight (Mw) measured by gel permeation chromatography (GPC) is usually in the range of from 5,000 to 1,000,000, preferably from 8,000 to 500,000, and more preferably from 10,000 to 200,000.

The molecular weight distribution (Mw/Mn) is usually 0.6 or less, preferably 5.5 or less, and more preferably 5.0 or less. In addition, Mn refers to the number average molecular weight.

Manufacturing of the above polyolefin can be carried out by any one of known conventional methods, for example, by polymerization using titanium-based catalysts, vanadium-based catalysts, metallocene catalysts, etc.

(Epoxy Group-Containing Ethylenically Unsaturated Monomer (B))

The epoxy group-containing ethylenically unsaturated monomer is a monomer containing at least one of a polymerizable unsaturated bond and at least one of an epoxy group in the molecule. Examples of the epoxy group-containing ethylenically unsaturated compound include glycidyl acrylate; glycidyl (meth)acrylate; mono- and dialkylglycidyl esters (wherein the alkyl group for the monoglycidyl ester has 1 to 12 carbon atoms) of dicarboxylic acids such as, mono- and diglycidyl esters of maleic acid, mono- and diglycidyl esters of fumaric acid, mono- and diglycidyl esters of crotonic acid, mono- and diglycidyl esters of tetrahydrophthalic acid, mono- and diglycidyl esters of itaconic acid, mono- and diglycidyl esters of butene tricarboxylic acid, mono- and diglycidyl esters of citraconic acid, monoglycidyl and diglycidyl esters of endo-cis-bicyclo [2.2.1]hept-5-ene-2,3-dicarboxylic acid (nadic acid TM), mono- and diglycidyl esters of endo-cis-bicyclo[2.2.1]hept-5-ene-2-methyl-2,3-dicarboxylic acid (methyl nadic acid TM) and mono- and diglycidyl esters of allyl succinic acid; alkyl glycidyl esters of p-styrene carboxylic acid; allyl glycidyl ether; 2-methylallyl glycidyl ether; styrene-p-glycidyl ether; 3,4-epoxy-1-butene; 3,4-epoxy-3-methyl-1-butene; 3,4-epoxy-3-pentene; 3,4-epoxy-3-methyl-1-pentene; and 5,6-epoxy-1-hexene.

Among these compounds, it is preferable to use glycidyl acrylate, glycidyl (meth)acrylate, mono- and diglycidyl esters of maleic acid.

(Alicyclic Epoxy Group-containing Ethylenically Unsaturated Monomer)

In addition, in addition to these, examples of the epoxy group-containing ethylenically unsaturated monomer (B) used in the present invention include preferably the alicyclic epoxy group-containing ethylenically unsaturated monomer represented by the following formulae (1) to (5):

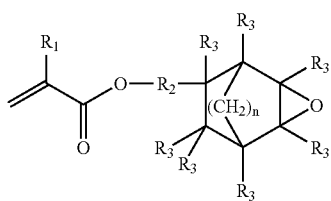

(1)

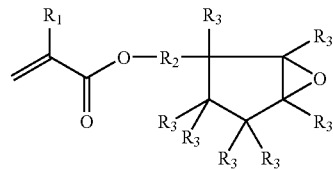

(2)

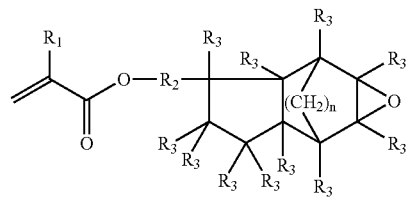

(3)

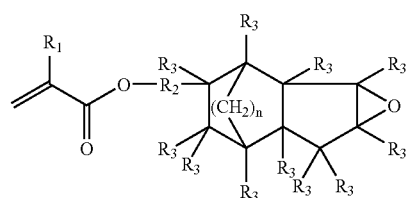

(4)

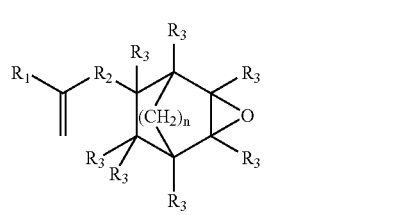

(5)

(wherein $R_1$ is a hydrogen atom or a methyl group, $R_2$ is a single bond or a bivalent hydrocarbon group having from 1 to 20 carbon atoms and optionally containing hetero atoms, $R_3$ is a hydrogen atom or a hydrocarbon group having from 1 to 20 carbon atoms and optionally containing hetero atoms, and n is an integer between 0 and 2, with the proviso that $R_3$ may be all the same or different from each other.)

Examples of the bivalent hydrocarbon group having from 1 to 20 carbon atoms and optionally containing hetero atoms, of $R_2$, include an alkylene group such as methylene, ethylene, propylene, and butylene, a (poly)alkylene oxide such as ethylene oxide and polyethylene oxide, and an arylene group such as phenylene group.

Examples of the hydrocarbon group having from 1 to 20 carbon atoms and optionally containing hetero atoms, of $R_3$, include an alkyl group such as methyl, ethyl, propyl, and butyl, a hydroxyl group, and an alkoxy group such as methoxy and ethoxy.

Specific examples of these compounds include compounds represented by the following structural formulae:

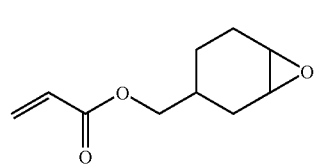

-continued

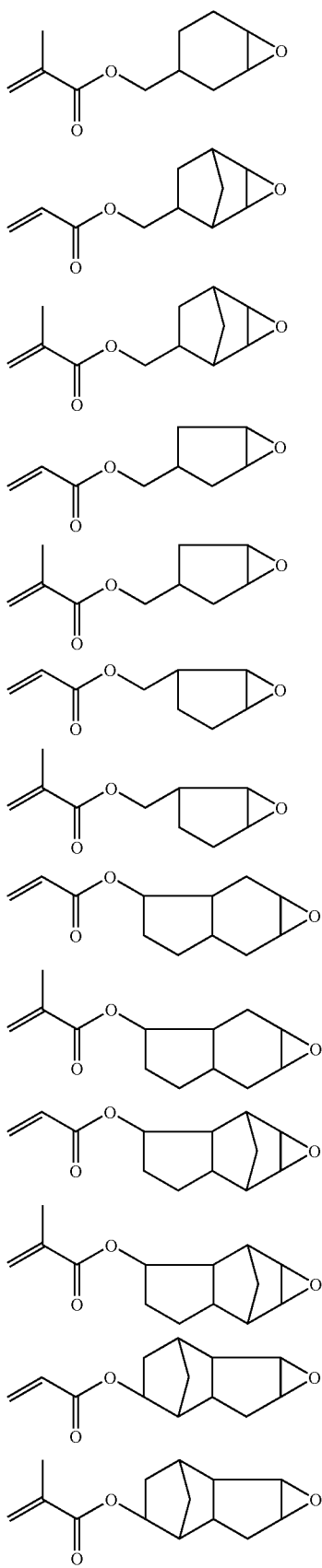

-continued

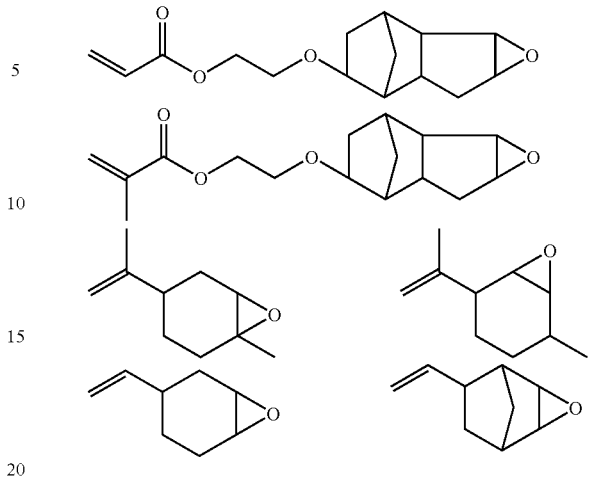

(Aromatic Vinyl Monomer (C))

In the present invention, it is preferable to use the aromatic vinyl monomer (C) simultaneously with the epoxy group-containing ethylenically unsaturated monomer.

Examples of the aromatic vinyl monomer (C) include a compound represented by the following formula [I]:

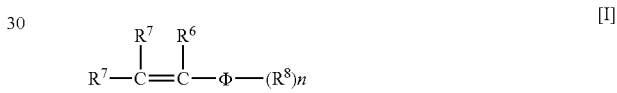

In the above formula [I], $R^6$ and $R^7$ may be the same or different each other, and is a hydrogen atom or an alkyl group having from 1 to 3 carbon atoms, and specific examples thereof include a methyl group, an ethyl group, a propyl group and an isopropyl group. Also, $R^8$ is a hydrocarbon group having from 1 to 3 carbon atoms or a halogen atom, and specific examples thereof include a methyl group, an ethyl group, a propyl group, an isopropyl group, a chlorine atom, a bromine atom or an iodine atom. Further, n is an integer usually between 0 and 5, and preferably of 1 to 5. In addition, [Φ]in the formula [I] is an aromatic ring optionally containing hetero atoms. In addition, $R^7$ may be all the same or different from each other, and $R^8$ may be all the same or different from each other.

Specific examples of the aromatic vinyl monomer include styrene, α-methylstyrene, o-methylstyrene, p-methylstyrene, m-methylstyrene, p-chlorostyrene, m-chlorostyrene, p-chlorostyrene, 4-vinyl pyridine, 2-vinyl pyridine, 5-ethyl-2-vinyl pyridine, 2-methyl-5-vinyl pyridine, 2-isopropenyl pyridine, 2-vinyl quinoline, 3-vinyl isoquinoline, N-vinyl carbazole, and N-vinyl pyrrolidone.

(Ethylenically Unsaturated Monomer Other Than (B) and (C))

In the present invention, the ethylenically unsaturated monomer other than the epoxy group-containing ethylenically unsaturated monomer (B) and the aromatic vinyl monomer (C) is optionally used, provided that such monomers are within the spirit or scope of the present invention.

Examples of the ethylenically unsaturated monomers that may be used in the present invention include hydroxyl group-containing ethylenically unsaturated compounds, amino group-containing ethylenically unsaturated compounds, unsaturated carboxylic acids and derivatives thereof, vinyl ester compounds, vinyl chlorides, and oxazoline group-containing unsaturated monomers.

Specific examples of the hydroxyl group-containing ethylenically unsaturated compounds include (meth)acrylic acid esters, such as, hydroxyethyl (meth)acrylate, 2-hydroxypropyl (meth)acrylate, 3-hydroxypropyl (meth)acrylate, 2-hydroxy-3-phenoxypropyl (meth)acrylate, 3-chloro-2-hydroxypropyl (meth)acrylate, glycerin mono(meth)acrylate, pentaerythritol mono(meth)acrylate, trimethylolpropane mono(meth)acrylate, tetramethylolethane mono(meth)acrylate, butanediol mono(meth)acrylate, polyethyleneglycol mono(meth)acrylate, and 2(6-hydroxyhexanoyloxy)ethylacrylate, as well as 10-undecen-1-ol, 1-octen-3-ol, 2-methanolnorbornene, hydroxystyrene, hydroxyethyl vinyl ether, hydroxybutyl vinyl ether, N-methylolacrylamide, 2-(meth)acryloyloxyethyl acid phosphate, glycerin monoallyl ether, allyl alcohol, allyloxyethanol, 2-butene-1,4-diol and glycerin monoalcohol.

The amino group-containing ethylenically unsaturated compound is a compound containing ethylenic double bond(s) and amino group(s). For such compounds, there can be exemplified a vinyl monomer having at least one amino group or a substituted amino group represented by the following formula:

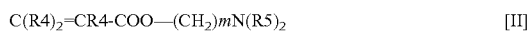

$C(R4)_2=CR4\text{-}COO\text{---}(CH_2)_m N(R5)_2$      [II]

In the formula [II], each R4 is independently a hydrogen atom, a methyl group or an ethyl group, each R5 is independently a hydrogen atom, an alkyl group having from 1 to 12 carbon atoms, preferably 1 to 8 carbon atoms or a cycloalkyl group having from 6 to 12 carbon atoms, preferably 6 to 8 carbon atoms. In addition, the alkyl group or the cycloalkyl group may further have a substituent. Further, m is an integer between 1 and 5, preferably 1 to 3.

Specific examples of the amino group-containing ethylenically unsaturated compound include alkyl ester derivatives of acrylic acid or methacrylic acid, such as aminoethyl (meth)acrylate, propylaminoethyl (meth)acrylate, dimethylaminoethyl methacrylate, aminopropyl (meth)acrylate, phenylaminoethyl methacrylate, and cyclohexylaminoethyl methacrylate; vinylamine derivatives such as N-vinyldiethylamine and N-acetylvinylamine; allylamine derivatives such as allylamine, methacrylamine, N-methylacrylamine, N,N-dimethylacrylamine and N,N-dimethylaminopropylacrylamine; acrylamide derivatives such as acrylamide and N-methylacrylamide; aminostyrenes such as p-aminostyrene; imide 6-aminohexylsuccinate and imide 2-aminoethylsuccinate.

As the unsaturated carboxylic acid, there may be exemplified unsaturated carboxylic acids, such as, acrylic acid, methacrylic acid, maleic acid, fumaric acid, tetrahydrophthalic acid, itaconic acid, citraconic acid, crotonic acid, isocrotonic acid, norbornene dicarboxylic acid, bicyclo[2.2.1]hept-2-ene-5,6-dicarboxylic acid, or their anhydrides or their derivatives (for example, acid halides, amides, imides, esters, etc.).

Specific examples include malenyl chloride, malenyl imide, maleic anhydride, itaconic anhydride, citraconic anhydride, tetrahydrophthalic anhydride, bicyclo[2.2.1]hept-2-ene-5,6-dicarboxylic acid anhydride, dimethyl maleate, monomethyl maleate, diethyl maleate, diethyl fumarate, dimethyl itaconate, diethyl citraconate, dimethyl tetrahydrophthalate, dimethyl bicyclo[2.2.1]hept-2-ene-5,6-dicarboxylate, hydroxyethyl (meth)acrylate, hydroxypropyl (meth)acrylate, glycidyl (meth)acrylate, aminoethyl methacrylate and aminopropyl methacrylate. Among them, (meth)acrylic acid, maleic anhydrid, hydroxyethyl (meth)acrylate, glycidyl methacrylate and aminopropyl methacrylate are preferred.

Examples of the vinyl ester compound include vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl p-t-butylbenzoate, vinyl salicylate, and vinyl cyclohexanecarboxylate.

Specific examples of the oxazoline group-containing unsaturated monomer include 2-vinyl-2-oxazoline, 5-methyl-2-vinyl-2-oxazoline, 4,4-dimethyl-2-vinyl-2-oxazoline, 4,4-dimethyl-2-vinyl-5,6-dihydro-4H-1,3-oxazine, 4,4,6-trimethyl-2-vinyl-5,6-dihydro-4H-1,3-oxazine, 2-isopropenyl-2-oxazoline, 4,4-dimethyl-2-isopropenyl-2-oxazoline, ricinoloxazoline acrylate, ricinoloxazoline methacrylate, and ricinoloxazoline maleate. Among them, ricinoloxazoline acrylate, ricinoloxazoline methacrylate and ricinoloxazoline maleate are preferred.

Examples of the modified polyolefin (D) suitable as an adhesive resin for the LC polymer of the present invention include the modified polyolefin (D-1).

Modified Polyolefin (D-1)

The modified polyolefin (D-1) formed by graft polymerizing 0.01 to 20% by weight of the epoxy group-containing ethylenically unsaturated monomer (B) to the polyolefin (A) wherein the polyolefin (A) is an ethylene homopolymer (A-1) or a copolymer (A-2) of ethylene and at least one α-olefin selected from α-olefin having from 3 to 20 carbon atoms, the ethylene homopolymer (A-1) or the copolymer (A-2) has a density of 0.895 g/cc or more, a melt flow rate (190° C. and a load of 2.16 kg) is within the range of from 0.01 to 500 g/10 minutes (with the proviso that, in the modified polyolefin (D-1), the epoxy group-containing ethylenically unsaturated monomer (B) is the epoxy group-containing ethylenically unsaturated monomer excluding the alicyclic epoxy group-containing ethylenically unsaturated monomers represented by the above formulae (1) to (5)).

As the modified polyolefin (D-1), the following modified polyolefin (d-1) is more preferred.

Modified Polyolefin (d-1)

The modified polyolefin formed by graft polymerizing 0.01 to 20% by weight of the epoxy group-containing ethylenically unsaturated monomer (B) and 0.01 to 20% by weight of the aromatic vinyl monomer (C) to the polyolefin (A) wherein the polyolefin (A) is an ethylene homopolymer (A-1) or a copolymer (A-2) of ethylene and at least one α-olefin selected from α-olefin having from 3 to 20 carbon atoms, the ethylene homopolymer (A-1) or the copolymer (A-2) has a density of 0.895 g/cc or more and a melt flow rate (190° C. and a load of 2.16 kg) is within the range of from 0.01 to 500 g/10 minutes.

The modified polyolefin (d-1) of the present invention can be manufactured by reacting the polyolefin (A) with the epoxy group-containing ethylenically unsaturated monomer (B), and the aromatic vinyl monomer (C), and, if necessary, the ethylenically unsaturated monomer other than (B) and (C) under heating in the presence or absence of a radical initiator.

The reaction efficiency of this graft polymerization is increased when performed in the presence of the radical initiator, hence it is preferable to carry out graft reaction using the radical initiator in manufacturing the modified polyolefin (d-1) of the present invention.

Examples of the radical initiator used herein include an organic peroxide or an azo compound.

Specific examples of the organic peroxide include dicumyl peroxide, di-t-butyl peroxide, 2,5-dimethyl-2,5-bis (t-butylperoxy)hexane, 2,5-dimethyl-2,5-bis(t-butylperoxy) hexyne-3, 1, 3-bis (t-butylperoxyisopropyl) benzene, 1,1-bis (t-butylperoxy)valerate, benzoyl peroxide, t-butylperoxy benzoate, acetyl peroxide, isobutyryl peroxide, octanoyl peroxide, decanoyl peroxide, lauroyl peroxide, 3,5,5-trimethylhexanoyl peroxide, 2,4-dichlorobenzoyl peroxide and m-toluyl peroxide. In addition, examples of the azo compound include azoisobutyronitrile and dimethylazoisobutyronitrile.

The radical initiator is used in general in an amount of 0.001 to 10 parts by weight, preferably 0.05 to 5 parts by weight per 100 parts by weight of the polyolefin (A). The radical initiator can be employed as such by mixing with the polyolefin (A), or can be also used by dissolving it in a small amount of an organic solvent.

As the organic solvent to be employed here, every organic solvent capable of dissolving the radical initiator can be used without any restriction. Examples of the organic solvent include an aromatic hydrocarbon solvent such as benzene, toluene and xylene; an aliphatic hydrocarbon solvent such as pentane, hexane, heptane, octane, nonane and decane; an alicyclic hydrocarbon solvent such as cyclohexane, methylcyclohexane and decahydronaphthalene; a chlorinated hydrocarbon such as chlorobenzene, dichlorobenzene, trichlorobenzene, methylene chloride, chloroform, carbon tetrachloride and tetrachloroethylene; an alcohol solvent such as methanol, ethanol, n-propanol, iso-propanol, n-butanol, sec-butanol and tert-butanol; a ketone solvent such as acetone, methyl ethyl ketone and methyl isobutyl ketone; an ester solvent such as ethyl acetate and dimethyl phthalate; and an ether solvent such as dimethyl ether, diethyl ether, di-n-amyl ether, tetrahydrofuran and dioxyanisole.

In addition, in the present invention, on graft-modifying the polyolefin (A), a reducing substance may also be used. The reducing substance has a function of increasing the grafted amount in the resulting modified polyolefin (d-1).

Examples of the reducing substance include iron (II) ion, chromium ion, cobalt ion, nickel ion, palladium ion, sulfite, hydroxyamine, hydrazine, as well as compounds having groups such as —SH, —SO$_3$H, —NHNH$_2$, and —COCH(OH)—.

Specific examples of these reducing substances include ferrous chloride, potassium bichromate, cobalt chloride, cobalt naphthenate, palladium chloride, ethanolamine, diethanolamine, N,N-dimethylaniline, hydrazine, ethyl mercaptan, benzenesulfonic acid, and p-toluenesulfonic acid.

The reducing substance mentioned above is used usually in an amount of 0.001 to 5 parts by weight, preferably 0.1 to 3 parts by weight per 100 parts by weight of the polyolefin (A).

The graft polymerization stated above may be performed under any of the following conditions in that at least part of the polyolefin (A) is in a solid state, molten state, or at least partly dissolved in an organic solvent.

In the case where the graft polymerization is performed under the conditions where at least part of the thermoplastic polymer is dissolved in an organic solvent, it is performed usually at 50 to 200° C., preferably at 60 to 190° C., and more preferably at 70 to 180° C.

The organic solvent used in the graft polymerization is any of those capable of dissolving the thermoplastic polymer, and is not particularly limited. Examples of the organic solvent suitable for use with the ethylenic polymer (A) include aromatic hydrocarbon solvents such as benzene, toluene and xylene, and aliphatic hydrocarbon solvents such as pentane, hexane, and heptane.

Also, the epoxy group-containing ethylenically unsaturated monomer (B) and the aromatic vinyl monomer (C) are added by the following methods:

(1) (B) and (C) are added all at once before initiation of reaction, (2) either of (B) and (C) is added before initiation of reaction, temperature is increased and the other monomer is added, and (3) after both (B) and (C) are warmed, they are added by dropping for a predetermined period. Among them, use of method (3), wherein after both (B) and (C) are warmed, they are added by dropping for the predetermined period is preferable.

In addition, in this case, (B) and (C) may be dropped using separate inlet tubes or may be added (dropped) by mixing them. The latter method is preferable.

In the case where the radical polymerization initiator is used, it may be added all at once before initiation of reaction, or may be dropped in a predetermined duration after heating. The latter method, wherein the initiator is dropped in a predetermined duration after heating, is preferable. In this case, the radical polymerization initiator is dropped preferably through a separate inlet tube independently from (B) and (C) inlet tubes.

Also, in the case where the graft polymerization is carried out under the conditions in which the polyolefin (A) is in a molten state, the reaction is carried out usually at temperatures higher than the melting point of the polyolefin (A). That is, graft polymerization reaction is carried out at temperatures higher than the melting point of the polyolefin (A), specifically, usually at 80 to 300° C., and preferably at 80 to 250° C.

In the case where an extruder is used in graft polymerization, examples of the method include a method wherein:

(1) the polyolefin (A), the epoxy group-containing ethylenically unsaturated monomer (B) and the aromatic vinyl monomer (C), and optionally the radical initiator are premixed and the resulting mixture is fed through a hopper; or (2) the polyolefin (A) and the aromatic vinyl monomer (C), and optionally the radical initiator are fed through a hopper, and the epoxy group-containing ethylenically unsaturated monomer (B) optionally dissolved in the solvent is fed through an inlet provided at an arbitrary place between a hopper part and the tip of the extruder.

The grafted amount of the epoxy group-containing ethylenically unsaturated monomer in the modified polyolefin (d-1) prepared as above is usually in the range of from 0.01 to 20% by weight, preferably from 0.02 to 15% by weight, and more preferably from 0.03 to 10% by weight.

In addition, the grafted amount of the aromatic vinyl monomer contained in the modified polyolefin (d-1) is usually in the range of from 0.01 to 20% by weight, preferably from 0.02 to 15% by weight, and more preferably from 0.03 to 10% by weight.

The mole ratio between the epoxy group-containing ethylenically unsaturated monomer (B) and the aromatic vinyl monomer (C) that are graft polymerized in the modified polyolefin (d-1) of the present invention is usually from 10:90 to 95:5, preferably from 20:80 to 90:10, more preferably from 25:75 to 85:15, and most preferably from 30:70 to 80:20.

In the case where the epoxy group-containing ethylenically unsaturated monomer (B) and the aromatic vinyl monomer (C) are graft polymerized with these mole ratios, the modified polyolefin (d-1) thus obtained has excellent adhesiveness to the LC polymer and excellent solvent resistance.

Examples of the modified polyolefin (D) suitable as the adhesive resin for the LC polymer of the present invention include the modified polyolefin (D-2) described below:

Modified Polyolefin (D-2)

The modified polyolefin prepared by graft polymerizing at least one alicyclic epoxy group-containing ethylenically unsaturated monomer represented by the above formulae (1) to (5) to a polyolefin (A) obtained by polymerizing one or more olefins selected from ethylene and α-olefin having from 3 to 20 carbon atoms, in an amount in the range of from 0.01 to 50% by weight, with the proviso that the modified polyolefin is 100% by weight.

The modified polyolefin (D-2) is preferably prepared by graft polymerizing at least one alicyclic epoxy group-containing ethylenically unsaturated monomer (B) represented by the above formulae (1) to (5) in the range of from 0.01 to 50% by weight, and the other ethylenically unsaturated monomer in the range of from 0.01 to 50% by weight to a polyolefin (A) obtained by polymerizing one or more olefins selected from ethylene and α-olefin having from 3 to 20 carbon atoms, with the proviso that the modified polyolefin is 100% by weight and the total grafted amount of (B) and the other ethylenically unsaturated monomer is in the range of from 0.02 to 60% by weight.

In this case, the polyolefin (A) is preferably the ethylene homopolymer (A-1) or the ethylene copolymer (A-2), and the density of the polyolefin (A) is preferably 0.895 g/cc or more. In addition, the other ethylenically unsaturated monomer is preferably the aromatic vinyl monomer (C).

Graft Polymerization

The modified polyolefin (D-2) of the present invention can be obtained by graft polymerization of the polyolefin (A) with at least one alicyclic epoxy group-containing ethylenically unsaturated monomer (B) represented by the aforementioned formulae (1) to (5) and optionally the other ethylenically unsaturated monomer, by heating in the presence or absence of the radical initiator.

Graft polymerization is preferably carried out in the presence of the radical initiator so that graft polymerization reaction efficiency is higher. Examples of the radical initiator used herewith include the organic peroxide or the azo compound.

Specific examples of the organic peroxide and the azo compound are similar to those listed in the aforementioned modified polyolefin (d-1).

The radical initiator is preferably used in general in the range of from 0.001 to 10 parts by weight per 100 parts by weight of the polyolefin.

The radical initiator can be employed as such by mixing with the polyolefin (A) and the alicyclic epoxy group-containing ethylenically unsaturated monomer, or can be also used by dissolving it in a small amount of an organic solvent. As the organic solvent to be employed here, every organic solvent capable of dissolving the radical initiator can be used without any particular restriction.

Examples of the organic solvent are similar to those listed in the aforementioned modified polyolefin (d-1).

In addition, in the present invention, on graft-modifying the polyolefin, a reducing substance may also be used. The reducing substance has a function of increasing the grafted amount in the resulting modified polyolefin.

Examples of the reducing substance are similar to those listed in the aforementioned modified polyolefin (d-1).

The above reducing substances are used usually in the range of from 0.001 to 5 parts by weight, preferably in the range of from 0.1 to 3 parts by weight per 100 parts by weight of polyolefin (A).

The graft polymerization stated above may be performed under any of the following conditions in that at least part of the polyolefin (A) is in a solid state, molten state, or at least partly dissolved in an organic solvent.

In the case where the graft polymerization is performed under the conditions where at least part of the polyolefin (A) is dissolved in an organic solvent, it is performed usually at 50 to 200° C., preferably at 60 to 190° C., and more preferably at 70 to 180° C.

The organic solvent used in the graft polymerization is any of those capable of dissolving the polyolefin (A), and is not particularly limited. Examples of the organic solvent include aromatic hydrocarbon solvents such as benzene, toluene and xylene, and aliphatic hydrocarbon solvents such as pentane, hexane, and heptane.

Also, in the case where the graft polymerization is carried out under the condition where the polyolefin (A) is in a molten state, the reaction temperature is usually higher than the melting point of the polyolefin. Specifically, the reaction temperature is usually at 80 to 300° C., and preferably at 80 to 250° C.

In the case where an extruder is used in the graft polymerization, examples of the method include a method wherein:

(1) the polyolefin, the alicyclic epoxy group-containing ethylenically unsaturated monomer (including optionally the other ethylenically unsaturated monomer) and optionally the radical initiator are premixed and the resulting mixture is fed to the extruder through a hopper, and (2) the polyolefin and optionally the radical initiator are fed to the extruder through a hopper, and the alicyclic epoxy group-containing ethylenically unsaturated monomer optionally dissolved in the solvent is fed through an inlet provided at an arbitrary place between hopper part and the tip of the extruder.

In addition, in the case where both the alicyclic epoxy group-containing ethylenically unsaturated monomer (B) and the other ethylenically unsaturated monomer are graft polymerized, each monomer may be mixed and then added, each monomer may be added through separate inlet tubes, or one monomer may be added after the other monomer is added. Among them, the method wherein the alicyclic epoxy group-containing ethylenically unsaturated monomer (B) and the other ethylenically unsaturated monomer are mixed and then added, or the method where each monomer is added to the reaction system through the separate inlet tubes is preferable as the method gives high grafting efficiency, and yields the modified polyolefin (D-2) with excellent adhesiveness performance.

The grafted amount of the grafted groups derived from the alicyclic epoxy group-containing ethylenically unsaturated monomer in the thus prepared modified polyolefin (D-2) is usually in the range of from 0.01 to 50% by weight, preferably from 0.02 to 30% by weight, more preferably from 0.03 to 10% by weight, and most preferably from 0.03 to 5% by weight, with respect to the modified polyolefin as 100% by weight.

In the present invention, in the case where the other ethylenically unsaturated monomer is graft polymerized with the alicyclic epoxy group-containing ethylenically unsaturated monomer (B), the grafted amount of the other ethylenically unsaturated monomer is usually in the range of from 0.01 to 50% by weight, preferably from 0.02 to 30% by weight, more preferably from 0.03 to 10% by weight, and most preferably from 0.03 to 5% by weight. Note however, in this case the total grafted amount of the alicyclic epoxy group-containing ethylenically unsaturated monomer (B) and the other ethylenically unsaturated monomer is usually from 0.02 to 60% by weight, preferably from 0.03 to 40% by weight, more preferably from 0.04 to 20% by weight, and most preferably from 0.06 to 10% by weight.

Also, the ratio of the grafted amount of the alicyclic epoxy group-containing ethylenically unsaturated monomer (B) and that of the other ethylenically unsaturated monomer is usually from 99.5:0.5 to 1.0:99.0, preferably from 90:10 to 5:95, and more preferably from 80:20 to 10:90.

As stated above, the method of the graft polymerization is explained with the modified polyolefins (d-1) and (D-2) as examples. The modified polyolefin (D) other than those described above can be manufactured by the graft polymerization according to the condition described above or a condition with appropriate changes.

(Adhesive Resin and Adhesive Resin Composition)

The adhesive resin for the LC polymer of the present invention is characterized by comprising the modified polyolefin described above.

Also, the adhesive resin composition for the LC polymer of the present invention may be formed from two or more kinds of polymers selected from the modified polyolefin (D) described above, or from the modified polyolefin (D) described above and the thermoplastic resin (E) other than said polymers.

Particularly, the adhesive resin composition preferably comprises 1 to 90% by weight of the modified polyolefin (D), based on the total of the modified polyolefin (D) and the thermoplastic resin (E) as 100% by weight.

In the present invention, one kind of the thermoplastic resin (E) selected from the listed below is preferably used: polyolefin, polyamide, polyester, polyacetal, polystyrene, acrylonitrile-butadiene-styrene copolymer (ABS), polymethacrylate, polycarbonate, polyphenylene oxide, polyvinyl chloride, polyvinylidene chloride, polyvinyl acetate and ethylene-(meth)acrylate ester copolymer, diene-based polymer.

Examples of the polyolefin include olefin homopolymers such as polyethylene, polypropylene, poly-1-butene, polymethylpentene, and polymethylbutene; and olefin copolymers such as ethylene-α-olefin random copolymer, ethylene-propylene-diene ternary copolymer, propylene-ethylene random copolymer, propylene-α-olefin random copolymer, propylene-ethylene-α-olefin ternary copolymer. Among them, polyethylene, polyproylene, ethylene-α-olefin random copolymer, ethylene-propylene-diene ternary copolymer, propylene-ethylene random copolymer, and propylene-α-olefin random copolymer are preferably used. In addition, in the case where the polyolefin is obtained from an olefin having three or more carbon atoms, it may be an isotactic polymer or a syndiotactic polymer.

Also, any of known catalysts such as Ziegler-Natta type catalyst or metallocene catalyst catalysts may be used for manufacture of the polyolefin.

Examples of the polyamide include aliphatic polyamides such as nylon-6, nylon-66, nylon-10, nylon-12 and nylon-46; and aromatic polyamides manufactured from aromatic dicarboxylic acids and aliphatic diamines, of which nylon-6 is preferable.

Examples of the polyester include aromatic polyesters such as polyethylene terephthalate, polyethylene naphthalate, and polybutylene terephthalate, polycaprolactone, and polyhydroxybutyrate, of which polyethylene terephthalate is preferable.

Examples of the polyacetal include polyformaldehyde (polyoxymethylene), polyacetaldehyde, polypropionaldehyde, and polybutylaldehyde, of which polyformaldehyde is particularly preferable.

The polystyrene may be a styrene homopolymer, or a binary copolymer between styrene and acrylonitrile, methyl methacrylate, or α-methyl styrene such as acrylonitrile-styrene copolymer.

For ABS, those comprising a structural unit derived from acrylonitrile in the range of from 20 to 35 mole %, a structural unit derived from butadiene in the range of from 20 to 30 mole % and a structural unit derived from styrene in the range of from 40 to 60 mole % are preferably used.

For polymethacrylate, polymethyl methacrylate (PMMA) is preferable.

Examples of polycarbonates-include those-obtained from bis(4-hydroxyphenyl)methane, 1,1-bis(4-hydroxyphenyl)ethane, 2,2-bis(4-hydroxyphenyl)propane, or 2,2-bis(4-hydroxyphenyl)butane, of which polycarbonate obtained from 2,2-bis(4-hydroxyphenyl)propane is preferable.

For the polyphenylene oxide, poly(2,6-dimethyl-1,4-phenylene oxide) is preferable.

The polyvinyl chloride may be a vinyl chloride homopolymer, or a copolymer with vinylidene chloride, acrylic acid ester, acylonitrile, propylene, etc.

For the polyvinylidene chloride, a copolymer with vinyl chloride, acrylonitrile, (meth)acrylic acid ester, allylester, unsaturated ether, and styrene containing 85% or more of the vinylidene chloride unit is usually used.

The polyvinyl acetate may be a vinyl acetate homopolymer, or a copolymer with ethylene or vinyl chloride, of which the ethylene-vinyl acetate copolymer is preferable.

For the ethylene-(meth)acrylic acid ester copolymer, an ethylene-methylacrylate copolymer, an ethylene-ethylacrylate copolymer, an ethylene-methylmethacrylate copolymer, or an ethylene-ethylmethacrylate copolymer is preferable.

Examples of the diene-based polymer include polybutadiene, polyisoprene, or aromatic hydrocarbon-based block copolymer which is optionally hydrogenated.

The aromatic hydrocarbon-based block copolymer that is optionally hydrogenated is an aromatic-vinyl-conjugated diene block copolymer comprising a block polymer unit (X) derived from an aromatic vinyl and a block polymer unit (Y) derived from a conjugated diene, and a hydrogenated derivative thereof.

The chemical form of the aromatic vinyl-conjugated diene block copolymer is represented by $X(YX)_n$ or $(XY)n$ (where n is an integer of one or more), for example.

Among them, a block copolymer in the form of $X(YX)_n$, particularly of X-Y-X, is preferable, and specifically the styrene-based block copolymer in the form of polystyrene-polybutadiene (or polyisoprene or polyisoprene-butadiene)-polystyrene is preferable.

In the styrene-based block copolymer, an aromatic vinyl block polymer unit (X) which is a hard segment acts as a crosslinking point for a conjugated diene block polymer unit (Y), thus forming a physical crosslinking (domain). The conjugated diene block polymer unit (Y) present among the aromatic vinyl block polymer unit (X) is a soft segment and has rubber elasticity.

Specific examples of the aromatic vinyl compound forming the block polymer unit (X) described above include, besides styrene, styrene derivatives such as α-methylstyrene, 3-methylstyrene, p-methylstyrene, 4-propylstyrene, 4-dodecylstyrene, 4-cyclohexylstyrene, 2-ethyl-4-benzylstyrene, 4-(phenylbutyl)styrene. Among them, styrene is preferable.

Also, examples of the conjugated diene forming the block polymer unit (Y) include butadiene, isoprene, pentadiene, 2,3-dimethylbutadiene, and their combination. Among them, butadiene or isoprene or a combination of butadiene and isoprene is preferable.

In the case where the conjugated diene block polymer unit (Y) is derived from butadiene and isoprene, it contains preferably 40 mole % or more of an isoprene-derived unit.

In addition, the conjugated diene block polymer unit (Y) comprising such a butadiene-isoprene copolymer unit may be a random polymer unit, or a block copolymer unit, or a tapered copolymer unit between butadiene and isoprene.

The aromatic vinyl-conjugated diene block copolymer described above comprises 22% by weight or less, preferably 5 to 22% by weight of the aromatic vinyl block polymer unit (X). The amount of the aromatic vinyl polymer unit can be measured by conventional methods such as infrared spectroscopy, NMR spectroscopy, etc.

Also, the melt flow rate (MFR; ASTM D 1238, 200° C. and a load of 2.16 kg) of the aromatic vinyl-conjugated diene block copolymer is usually 5 g/10 minutes or more, preferably 5 to 100 g/10 minutes.

Various methods for manufacturing the aromatic vinyl-conjugated diene block copolymer are available. Examples thereof include:

(1) a method wherein the aromatic vinyl compound and then the conjugated diene are consecutively polymerized with an alkyllithium compound such as n-butyllithium as an initiator, (2) a method wherein the aromatic vinyl compound and then the conjugated diene are polymerized, and the resultant polymer is coupled using a coupling agent, (3) a method wherein the conjugated diene and then the aromatic vinyl compound are consecutively polymerized using a lithium compound as an initiator, etc.

In addition, the hydrogenated aromatic vinyl-conjugated diene block copolymer can be obtained by hydrogenation of the aforementioned aromatic vinyl-conjugated diene block copolymer using known methods. The hydrogenated aromatic vinyl-conjugated diene block copolymer have usually a hydrogenation degree of 90% or more.

The hydrogenation degree is based on the total amount of carbon-carbon double bonds in the conjugated diene block polymer unit (Y) as being 100%.

Specific examples of the hydrogenated aromatic vinyl-conjugated diene block copolymer include a hydrogenated styrene-isoprene block copolymer (SEP), a hydrogenated styrene-isoprene-styrene block copolymer (SEPS; a polystyrene-polyethylene/propylene-polystyrene block copolymer), and a hydrogenated styrene-butadiene block copolymer (SEBS; a polystyrene-polyethylene/butylene-polystyrene block copolymer). More specifically, examples thereof include HYBRAR (trade name, produced by Kuraray Co., Ltd.), Kraton (trade name, produced by Shell Chemical Co., Ltd.), Cariflex TR (trade name, produced by Shell Chemical Co., Ltd.), Solprene (trade name, produced by Phillips Petroleum Co., Ltd.), Europrene SOLT (trade name, produced by Anic S. p. A.), Tufprene (trade name, produced by Asahi Kasei Corporation), Solprene-T (trade name, produced by Japan Elastomer Co., Ltd.), JSR-TR (trade name, produced by Japan Synthetic Rubber Co., Ltd.), Denka STR (trade name, produced by Denki kagaku Kogyo K.K.), Quintack (trade name, produced by Zeon Corporation), Kraton G (trade name, produced by Shell Chemical Co., Ltd.) and Tuftec (trade name, produced by Asahi Kasei Corporation).

The thermoplastic resin (E) described above may be used alone or in combination with 2 or more kinds.

Among examples of the thermoplastic resin (E), polyolefin, polyester, polyamide, polystyrene, and diene-based polymer are preferably used.

In the case where the polyolefin is used as the thermoplastic resin (E), at least one ethylenic polymer selected from the ethylene homopolymer and at least one ethylenic copolymer comprising ethylene and at least one α-olefin selected from the α-olefins having from 3 to 20 carbon atoms are used preferably. Among the α-olefins that are copolymerized with ethylene, particularly preferable are propylene, 1-butene, 4-methyl-1-pentene, 1-hexene and 1-octene.

In the case where the ethylenic copolymer is used as the polyolefin, the amount of ethylene is usually 95 mole % or more, preferably 97 mole % or more, and more preferably 98 mole % or more.

The density of the ethylenic polymer used in the present invention is usually 0.895 g/cc or more, preferably 0.900 g/cc or more, and more preferably 0.910 g/cc or more.

A value of MFR of the ethylenic polymer used in the present invention measured at 190° C. is usually in the range of from 0.01 to 500 g/10 minutes, preferably from 0.05 to 200 g/10 minutes, and more preferably from 0.1 to 100 g/10 minutes.

The crystallinity of the ethylenic polymer used in the present invention is usually 25% or more, preferably 30% or more, and more preferably 35% or more.

The weight average molecular weight (Mw) of the ethylenic polymer used in the present invention measured by gel permeation chromatography (GPC) is usually in the range of from 5,000 to 1,000,000, preferably from 8,000 to 500,000, and more preferably from 10,000 to 200,000.

Also, the molecular weight distribution (Mw/Mn) is usually 6.0 or less, preferably 5.5 or less, and more preferably 5.0 or less.

The polyolefin described above can be manufactured by any of known methods, for example, by polymerization using a titanium-based catalyst, a vanadium-based catalyst and a metallocene catalyst.

The adhesive resin and the adhesive resin composition of the present invention can be used for adhesion between the polyolefin and the LC polymer, between the LC polymer and the LC polymer, between the LC polymer and another polar resin.

Examples of the polar resins other than the LC polymer that can be adhered to the adhesive resin composition of the present invention include polyamide, polyester, polyacetal, polystyrene, acrylonitrile-butadiene-styrene copolymer (ABS), polymethacrylate, polycarbonate, polyphenylene oxide, polyvinyl chloride, and polyvinylidene chloride.

(Other Additives)

The adhesive resin and the adhesive resin composition used in the present invention may contain a crosslinking agent, a filler, a crosslinking promoter, a crosslinking auxiliary agent, a softening agent, a tackifier, an antioxidant, a foaming agent, a processing aid, an inorganic filler, an organic filler, a crystal nucleating agent, a heat-resistant stabilizer, an anti-weathering stabilizer, an antistatic agent, a coloring agent, a lubricant, a flame retardant, and an anti-blooming agent.

Crosslinking Agent

Examples of the crosslinking agent include sulfur, a sulfur compound and an organic peroxide.

Examples of the sulfur include powder sulfur, precipitated sulfur, colloidal sulfur, surface treatment sulfur, insoluble sulfur, etc.

Examples of the sulfur compound include sulfur chloride, sulfur dichloride, and high molecular polysulfide. Also, the sulfur compound that undergoes crosslinking by liberating activated sulfur at crosslinking temperature, for example, morpholine disulfide, alkylphenol disulfide, tetramethylthiuram disulfide, dipentamethylenethiuram tetrasulfide, selenium dimethyldithiocarbamate, etc. may also be used. In addition, in the case where the sulfur or the sulfur compound is used as the crosslinking agent, it is preferable to use in combination with the crosslinking promoter.

Specific examples of the organic peroxide include alkylperoxides such as dicumyl peroxide (DCP), di-t-butyl peroxide, di-t-butylperoxy-3,3,5-trimethylcyclohexane, t-butylcumyl peroxide, di-t-amyl peroxide, 2,5-dimethyl-2,5-di(t-butylperoxy)hexine-3,2,5-dimethyl-2,5-di(benzolyperoxy) hexane, 2,5-dimethyl-2,5-di(t-butylperoxy)-hexane, α,α'-bis(t-butylperoxy-m-isopropyl)benzene, and t-butylhydroperoxides; peroxyesters such as t-butylperoxy acetate, t-butylperoxy isobutyrate, t-butylperoxy pivalate, t-butylperoxy maleate, t-butylperoxy neodecanoate, t-butylperoxy benzoate, di-t-butylperoxy phthalate; and ketone peroxides such as dicyclohexanone peroxide. The organic peroxide may be used alone or in combination with two or more peroxides.

Among them, the organic peroxide that a one-minute half-life is in the range of from 130 to 200° C. is preferable; specifically dicumyl peroxide, di-t-butyl peroxide, di-t-butylperoxy-3,3,5-trimethylcyclohexane, t-butylcumyl peroxide, di-t-amyl peroxide, t-butyl hydroperoxide, and 2,5-dimethyl-2,5-di-(t-butylperoxy)-hexane are preferable. Furthermore, in the case where the organic peroxide is used as the crosslinking agent, it is preferable to use in combination with the crosslinking auxiliary agent.

Among various kinds of the crosslinking agent, use of the sulfur or a sulfur-based compound, particularly use of the sulfur is preferable since a crosslinked product with excellent characteristics can be obtained. However, the organic peroxide is more preferable because of excellent degree of crosslinking.

In the case where the crosslinking agent is the sulfur or the sulfur-based compound, the corsslinking agent is usually used in the range of from 0.5 to 10 parts by weight, preferably from 0.5 to 9 parts by weight, and more preferably from 0.5 to 8 parts by weight with respect to 100 parts by weight of the adhesive resin and the adhesive resin composition.

In the case where the crosslinking agent is the organic peroxide, the crosslinking agent is used in the range of from 0.05 to 3.0 parts by weight, preferably from 0.1 to 1.5 parts by weight with respect to 100 parts by weight of the adhesive resin and the adhesive resin composition.

In addition, the crosslinking agent is used usually in the range of from $1 \times 10^{-5}$ to $1 \times 10^{-1}$ mole, preferably from $1 \times 10^{-5}$ to $1 \times 10^{-2}$ mole with respect to 100 grams of the adhesive resin and the adhesive resin composition described above.

Furthermore, whether the composition is crosslinked or not can be judged by finding out whether or not, after boiling the composition of the present invention for more than 4 hours in boiling xylene, the amount of residue filtered using a wire gauze of 400 mesh is more than 10 parts by weight with respect to 100 parts by weight of the adhesive resin and the adhesive resin composition described above.

Filler

The filler has either strengthening properties or does not have strengthening properties. The filler with strengthening properties enhances mechanical properties such as tensile strength, tear strength, and wear resistance. Specific examples of the filler with strengthening properties include a carbon black product such as SRF, GPF, FEF, MAF, HAF, ISAF, SAF, FT, and MT, a product derived by surface treatment thereof with a silane coupling agent, silica, activated calcium carbonate, and talc fine powder.

Crosslinking Promoter

Specific examples of the crosslinking promoter include thiazole-based compounds such as N-cyclohexyl-2-benzothiazole sulfenamide (CBZ), N-oxydiethylene-2-benzothiazole sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morphorinothio)benzothiazole, and dibenzothiazyl sulfide; guanidine compounds such as diphenylguanidine (DPG), triphenylguanidine, di-orthonitrileguanidine, orthonitrile biguanide, and diphenylguanidine phthalate; aldehyde-amine or aldehyde-ammonia-based compounds such as an acetaldehyde-aniline reaction product, butyraldehyde-aniline condensate, hexamethylenetetramine, and acetaldehyde-ammonia; imidazoline-based compound such as 2-mercaptoimidazoline; thiourea-based compounds such as thiocarbanilide, diethylthiourea, dibutylthiourea, trimethylthiourea, and di-orthotolylthiourea; thiuram-based compounds such as tetramethylthiuram monosulfide; tetramethylthiuram disulfide, tetraethylthiuram disulfide, tetrabutylthiuram disulfide, and pentamethylenethiuram tetrasulfide; dithioate-based compounds such as zinc dimthyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, and tellurium dimethyldithiocarbamate; xanthate-based compounds such as zinc dibutylxanthate; and a compound such as zinc white. The crosslinking promoters is used in the range of from 1 to 20 parts by weight, preferably from 2 to 10 parts by weight with respect to 100 parts by weight of the adhesive resin and the adhesive resin composition.

Crosslinking Auxiliary Agent

The crosslinking auxiliary agent is used in crosslinking with the organic peroxide. Specific examples of the crosslinking auxiliary agent include sulfur; quinonedioxime-based compounds such as p-quinonedioxime and p,p'-dibenzoylquinonedioxime; and polyfunctional monomers, i.e., (meth)acrylate-based compounds such as trimethylol propane triacrylate and polyethyleneglycol dimethacrylate; allylic compounds such as diallylphthalate, triallylcyanurate; maleimide-based compounds such as N,N'-m-phenylenebismaleimide; and divinylbenzene. The crosslingking auxiliary agent is used in the range of from 0.5 to 2 mole per 1 mole of the organic peroxide, and preferably by about the same amount as the organic peroxide. If the amount of the crosslinking auxiliary agent exceeds the amount described above, the crosslinking reaction proceeds excessively, which may reduce fluidity of the composition, lower moldability, and increase the unreacted monomer component remaining in the composition.

Softening Agent

Specific examples of the softening agent include petroleum-based softening agents such as process oil, lubricating oil, paraffin, liquid paraffin, petroleum asphalt, and vaseline; coal tar-based softening agents such as coal tar and coal tar pitch; fatty oil-based softening agents such as castor oil, linseed oil, rapeseed oil, and coconut oil; tall oil; sub (or rubber substitute); waxes such as bees wax, carnauba wax, and lanolin; fatty acid and fatty acid salts such as ricinolic acid, palmitic acid, barium stearate, calcium stearate, and zinc laurate; and synthetic polymer substances such as petroleum resin, atactic polypropylene, and coumarone-indene resin. Among them, the petroleum-based softening agent is preferably used, and particularly the process oil is preferably used. The softening agent is used in the range of 200 parts by weight or less, preferably in the range of from 5 to 200 parts by weight, more preferably from 10 to 150 parts by weight, and particularly preferably from 10 to 100 parts by weight with respect to 100 parts by weight of the adhesive resin and the adhesive resin composition.

Foaming Agent

Specific examples of the foaming agent include inorganic foaming agents such as sodium bicarbonate, sodium carbonate, ammonium bicarbonate, ammonium carbonate, and ammonium nitrite; nitroso compounds such as N,N'-dimethyl-N,N'-dinitrosoterephthalamide and N,N'-dinitrosopentamethylenetetramine; azo compounds such as azodicarbonamide, azobisisobutyronitrile, azocyclohexylnitrile, azoaminobenzene, and barium azodicarboxylate; sulfonyl hydrazide compounds such as benzenesulfonyl hydrazide, toluenesulfonyl hydrazide, p,p'-oxybis(benzenesulfonyl hydrazide), and diphenyl sulfone-3,3'-disulfonyl hydrazide; and azide compounds such as calcium azide, 4,4-diphenyl disulfonyl azide, and p-toluenesulfonyl azide. Among them, the nitroso compound, the azo compound and the azide compound are preferable. The foaming agent is used in the range of from 0.5 to 30 parts by weight, preferably from 1 to 20 parts by weight with respect to 100 parts by weight of the adhesive resin and the adhesive resin composition. From the adhesive resin and the adhesive resin composition containing the foaming agent in the amount stated above, a foam with the apparent specific gravity in the range of from 0.03 to 0.8 g/cm$^3$ can be manufactured.

Foaming Auxiliary Agent

The foaming auxiliary agent can be used with the foaming agent. Concurrent use of the foaming auxiliary agent is effective in reducing decomposition temperature of the foaming agent, accelerating decomposition, and homogenization of foams. Examples of the foaming auxiliary agent include organic acids such as salicylic acid, phthalic acid, stearic acid, and oxalic acid, urea or derivatives thereof. The foaming auxiliary agent is used in the range of from 0.01 to 10 parts by weight, and preferably from 0.1 to 5 parts by weight with respect to 100 parts by weight of the adhesive resin and the adhesive resin composition.

Processing Auxiliary Agent

The processing auxiliary agent that is generally added to rubbers can be widely used. Specific examples of the processing auxiliary agent include a higher fatty acid such as ricinolic acid, stearic acid, palmitic acid, and lauric acid, and a salt of the higher fatty acid such as barium stearate, zinc stearate, calcium stearate, or esters of the higher fatty acid.

The processing auxiliary agent is suitably used in the range of 10 parts by weight or less, and preferably in the range of 5 parts by weight or less per 100 parts by weight of the adhesive resin and the adhesive resin composition.

Inorganic Filler

Specific examples of the inorganic filler include natural silicic acids or silicates such as fine powder talc, kaolinite, sintered clay, pyrophyllite, sericite, and wallastonite; a carbonate such as precipitated calcium carbonate, heavy calcium carbonate, and magnesium carbonate; a hydroxide such as aluminum hydroxide and magnesium hydroxide; oxides such as zinc oxide, zinc white, and magnesium oxide; powder fillers of synthetic silicic acid or silicate such as hydrous calcium silicate, hydrous aluminum silicate, hydrous silicic acid, and anhydrous silicic acid; flaky fillers such as mica; fibrous fillers such as basic magnesium sulfate whisker, calcium titanate whisker, aluminum borate whisker, sepiolite, PMF (Processed Mineral Fiber), xonotlite, potassium titanate, and ellestadite; and balloon fillers such as glass balloon and fly ash balloon.

Among them, in the present invention, the talc is preferably used, and particularly the fine powder talc with an average particle size in the range of from 0.01 to 10 μm is preferably used. Note that the average particle size of the talc can be measured by a liquid-phase precipitation method.

The inorganic filler used in the present invention, particularly the talc may be unprocessed or pre-processed with surface treatment. Specific examples of the surface treatment include a chemical or physical process using treatment agents such as silane coupling agent, higher fatty acid, metal salt of fatty acid, unsaturated organic acid, organic titanate, resin acid, and polyethylene glycol. Use of the talc thus surface treated can produce molded articles with excellent weld strength, coatability, and moldability.

Two or more of the inorganic fillers described above may be concurrently used.

Also, in the present invention, together with the inorganic filler, the organic filler such as high styrene (rubber), lignin, and reclaimed rubber can be also used.

Crystal Nucleating Agent

Various nucleating agents known as the crystal nucleating agents are used without any particular limitation. Aromatic phosphoric ester salt, benzylidenesorbitol, aromatic carboxylic acid, rosin-based nucleating agents described below can be listed as examples of the crystal nucleating agent.

As the aromatic phosphoric ester salt, a compound represented by the following formula (9) can be given.

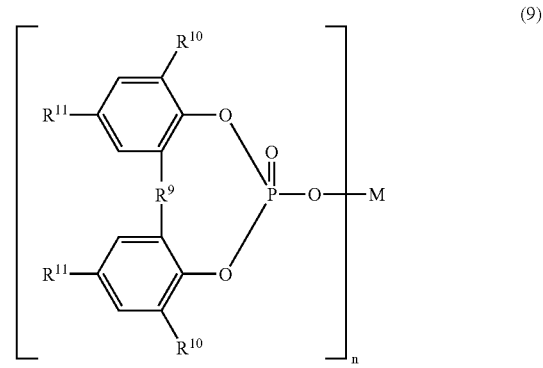

(9)

(wherein $R^9$ is an oxygen atom, a sulfur atom, or a hydrocarbon group having from 1 to 10 carbon atoms, $R^{10}$ and $R^{11}$ are a hydrogen atom or a hydrocarbon group having from 1 to 10 carbon atoms, and $R^{10}$ and $R^{11}$ may be the same or different, or form a ring structure comprising $R^{10}$ bonded to $R^{10}$, or $R^{11}$ bonded to $R^{11}$ or $R^{10}$ and $R^{11}$ bonded to each other and M is a metal atom having from 1 to 3 valences, and n is an integer between 1 and 3. $R^{10}$ may be all the same or different, and $R^{11}$ may be all the same or different.)

Specific examples of the compound represented by the aforementioned formula (9) include the following compounds, and mixtures of two or more thereof: sodium-2,2'-methylene-bis(4,6-di-t-butylphenyl)phosphate, sodium-2,2'-ethylidene-bis(4,6-di-t-butylphenyl)phosphate, lithium-2,2'-methylene-bis(4,6-di-t-butylphenyl)phosphate, lithium-2,2'-ethylidene-bis(4,6-di-t-butylphenyl)phosphate, sodium-2,2'-ethylidene-bis(4-i-propyl-6-t-butylphenyl)phosphate, lithium-2,2'-methylene-bis(4-methyl-6-t-butylphenyl)phosphate, lithium-2,2'-methylene-bis (4-ethyl-6-t-butylphenyl)phosphate, calcium-bis[2,2'-thiobis(4-methyl-6-t-butylphenyl)phosphate], calcium-bis[2,2'-thiobis(4-ethyl-6-t-butylphenyl)phosphate], calcium-bis[2,2'-thiobis-(4,6-di-t-butylphenyl)phosphate], magnesium-bis-[2,2'-thiobis(4,6-di-t-butylphenyl)phosphate], magnesium-bis[2,2'-thiobis-(4-t-octylphenyl)phosphate], sodium-2,2'-butylidene-bis(4,6-di-methylphenyl)phosphate, sodium-2,2'-butylidene-bis (4,6-di-t-butylphenyl)phosphate, sodium-2,2'-t-octylmethylene-bis(4,6-di-methylphenyl)phosphate, sodium-2,2'-t-octylmethylene-bis(4,6-di-t-butylphenyl)phosphate, calcium-bis-(2,2'-methylene-bis(4,6-di-t-butylphenyl)phosphate), magnesium-bis[2,2'-methylene-bis(4,6-di-t-butylphenyl)phosphate], barium-bis[2,2'-methylene-bis(4,6-di-t-butylphenyl)phosphate], sodium-2,2'-methylene-bis(4-methyl-6-t-butylphenyl)phosphate, sodium-2,2'-methylene-bis(4-ethyl-6-t-butylphenyl)phosphate, sodium(4,4'-dimethyl-5,6'-di-t-butyl-2,2'-biphenyl)phosphate, calcium-bis[(4,4'-dimethyl-6,6'-di-t-butyl-2,2'-biphenyl)phosphate], sodium-2,2'-ethylidene-bis(4-m-butyl-6-t-butylphenyl)phosphate, sodium-2,2'-methylene-bis(4,6-di-methylphenyl)phosphate, sodium-2,2'-methylene-bis(4,6-di-ethylphenyl)phosphate, potassium-2,2'-ethylidene-bis(4,6-di-t-butylphenyl)phosphate, calcium-bis[2,2'-ethylidene-bis(4,6-di-t-butylphenyl)phosphate], magnesium-bis[2,2'-ethylidene-bis(4,6-di-t-butylphenyl)phosphate], barium-bis[2,2'-ethylidene-bis(4,6-di-t-butylphenyl)phosphate], aluminum-tris[2,2'-methylene-bis(4,6-di-t-butylphenyl)phosphate, and aluminum-tris[2,2'-ethylidene-bis(4,6-di-t-butylphenyl)phosphate. In particular, sodium-2,2'-methylene-bis(4,6-di-t-butylphenyl)phosphate is preferable.

As the aromatic phosphoric ester salt, a compound represented by the following formula (10) can be given.

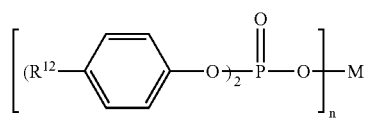
(10)

(wherein each $R^{12}$ may be the same or different, and is a hydrogen atom or a hydrocarbon group having from 1 to 10 carbon atoms, M is a metal atom having from 1 to 3 valences, and n is an integer between 1 and 3.)

Specific examples of the compound represented by the aforementioned formula (10) include the following compounds, and mixtures of two or more thereof: sodium-bis(4-t-butylphenyl)phosphate, sodium-bis(4-methylphenyl)phosphate, sodium-bis(4-ethylphenyl)phosphate, sodium-bis(4-i-propylphenyl)phosphate, sodium-bis(4-t-octylphenyl)phosphate, potassium-bis(4-t-butylphenyl)phosphate, calcium-bis(4-t-butylphenyl)phosphate, magnesium-bis(4-t-butylphenyl)phosphate, lithium-bis(4-t-butylphenyl)phosphate, and aluminum-bis(4-t-butylphenyl)phosphate. In particular, sodium-bis(4-t-butylphenyl)phosphate is preferable.

As the benzylidenesorbitol, a compound represented by the following formula (11) can be given.

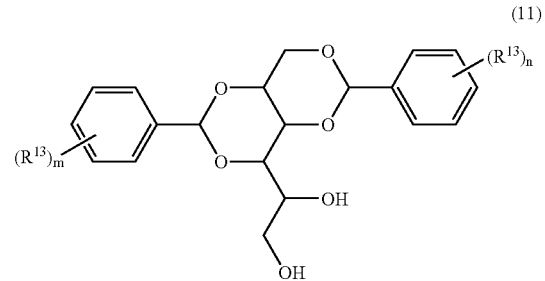
(11)

(wherein each $R^{13}$ may be the same or different, and is a hydrogen atom or a hydrocarbon group having from 1 to 10 carbon atoms, and m and n are integers from 0 to 5, respectively.)

Specific examples of the compound represented by the aforementioned formula (11) include the following compounds, and mixtures of two or more thereof: 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene)sorbitol, 1,3,2,4-di(p-t-butylbenzylidene)sorbitol, 1,3,2,4-di(2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlrorobenzylidene-2,4-benzylidenesorbitol, 1,3-p-chlorobenzylidene-2,4-p-methylbenzylidenesorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chtorobenzylidenesorbitol, and 1,3,2,4-di-(p-chlorobenzylidene)sorbitol. In particular, 1,3,2,4-dibenzylidenesorbitol, 1,3,2,4-di(p-methylbenzylidene)sorbitol, 1,3,2,4-di(p-ethylbenzylidene)sorbitol, 1,3-p-chlorobenzylidene-2,4-p-methylbenzylidenesorbitol, 1,3,2,4-di(p-chlorobenzylidene)sorbitol, and mixtures of two or more of these compounds are preferable.

Among the benzylidenesorbitol described above, a compound represented by the following formula (12) is given as a prefered example.

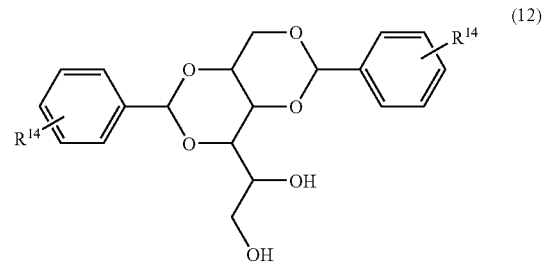
(12)

(wherein each $R^{14}$ may be the same or different, and is a methyl group or an ethyl group.)

As the aromatic carboxylic acid, aluminum hydroxy-di-p-t-butylbenzoate represented by the following formula (13) is given.

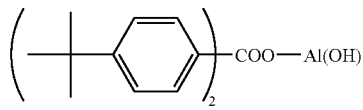

(13)

The rosin-based crystal nucleating agent is, for example, metal salt of rosin acid, and the metal salt of the rosin acid refers to a reaction product between the rosin acid and a metal compound. Examples of the rosin acid include natural rosin such as gum rosin, tall oil rosin, and wood rosin; various kinds of a modified rosin such as disproportionated rosin, hydrogenated rosin, dehydrogenated rosin, polymerized rosin, and α,β-ethylenically unsaturated carboxylic acid-modified rosin; a purified product of the aforementioned natural rosin, and a purified product of the aforementioned modified rosin. In addition, examples of the unsaturated carboxylic acid used for preparation of the aforementioned α,β-ethylenically unsaturated carboxylic acid-modified rosin include maleic acid, maleic anhydride, fumaric acid, itaconic acid, itaconic anhydride, citraconic acid, acrylic acid, and methacrylic acid. Among them, at least one rosin acid selected from a group comprising the natural rosin, modified rosin, purified product of the natural rosin, and purified product of the modified rosin is preferable. In the above, examples of the rosin acid include plural resin acids selected from pimaric acid, sandaracopimaric acid, parastric acid, isopimaric acid, abietic acid, dehydroabietic acid, neoabietic acid, dihydropimaric acid, dihydroabietic acid, and tetrahydroabietic acid.

The metal compound that forms metal salt in the reaction with the aforementioned rosin acid is a compound containing a metal element such as sodium, potassium, and magnesium, and undergoing salt formation with the aforementioned rosin acid. Specific examples thereof include chloride, nitrate, acetate, sulfate, carbonate, oxide, and hydroxide of the metal described above.

Other examples of the crystal nucleating agent include a high melting-point polymer, a metal salt of an aromatic carboxylic acid and an aliphatic carboxylic acid, an inorganic compound, etc.

Examples of the high-melting point polymer include a polyvinyl cycloalkane such as poly(vinylcyclohexane) and poly(vinylcyclopentane), poly(3-methyl-1-pentene), poly(3-methyl-1-butne), and a polyalkenyl silane.

Examples of the metal salt of the aromatic carboxylic acid and the aliphatic carboxylic acid include aluminum benzoate, aluminum p-t-butylbenzoate, sodium adipate, sodium thiophenecarboxylate, and sodium pyrrolecarboxylate.

(LC Polymer)

The LC polymer that is preferably used as an adherend for the adhesive resin and the adhesive resin composition of the present invention is an aromatic polyester and/or an aromatic polyester-amide, generally called a thermotropic LC polymer.

Specific examples thereof include (1) a polymer of a combination of an aromatic dicarboxylic acid, an aromatic diol and an aromatic hydroxycarboxylic acid; (2) a polymer of a combination of different kinds of aromatic hydroxycarboxylic acids; (3) polymer of a combination of an aromatic dicarboxylic acid and a nuclear-substituted aromatic diol, and (4) a polymer obtained by reacting a polyester such as polyethylene terephthalate with an aromatic hydroxycarboxylic acid, and the polymer forms an anisotropic melt at a temperature of not more than 400° C. In addition, in place of the aromatic dicarboxylic acid, aromatic diol and aromatic hydroxycarboxylic acid, an ester-forming derivative thereof may also be used.

In the present invention, among examples of the LC polymer, the LC polymer containing a monomer unit derived from one or more kinds, usually at least two kinds of monomers described below is preferably used: terephthalic acid, isophthalic acid, 1,4-hydroquinone, resorcinol, 4-aminobenzoic acid, 4-hydroxybenzoic acid, 4-aminophenol, 1,4-phenylenediamine, 4,4'-biphenol, 4,4'-biphenyldicarboxylic acid, 6-hydroxy-2-naphthoic acid, 2,6-naphthalenedicarboxylic acid, and 2,6-dihydroxynaphthalene.

(Molding Method)

A method of molding a laminated body comprising layers of the LC polymer using the adhesive resin and the adhesive resin composition of the present invention is publicly known, including, for example, lamination, co-extrusion, extrusion lamination, and co-extrusion coating.

In this case, a preferable structure of the laminated body is formed wherein the layer containing the polyolefin and the layer containing the LC polymer are adhered with a layer comprising the adhesive resin and the adhesive resin composition of the present invention.

The polyolefin used herein may be any of the aforementioned polyolefin.

Provided that these three layers are included, other layers may be included, and in an example of a five-layer structure, it may contain a first layer of the polyolefin, a second layer comprising the adhesive resin composition of the present invention, a third layer of the LC polymer, a fourth layer comprising the adhesive resin of the present invention, and a fifth layer of the polyolefin.

In the following, the present invention will be described by way of Examples, wherein it is to be noted that the present invention should not be restricted to these Examples.

Method of Measurement of Physical Properties Used in the Present Invention (1) Density A strand obtained during measurement of the melt flow rate at 190° C. under a load of 2.16 kg is subjected to heat treatment at 120° C. for 1 hour, and is slowly cooled to room temperature over 1 hour, and subsequently the density is measured using a density gradient tube.

(2) Melt Flow Rate (MFR)

MFR is measured under the load of 2.16 kg according to ASTM D1238-65T.

(3) Weight Average Molecular Weight (Mw) and Molecular Weight Distribution (Mw/Mn)

They were measured in the following manner using GPC-150C produced by Millipore Co., Ltd.

A separatory column of TSK GNH HT having a diameter of 72 mm and a length of 600 mm was used. The column temperature was set to 140° C. A sample (concentration: 0.1% by weight, amount: 500 µl) was moved in the column at a rate of 1.0 ml/min using o-dichlorobenzene (Wako Pure Chemical Industries, Ltd.) as a mobile phase and 0.025% by weight of BHT (available from Takeda Chemical Industries, Ltd.) as an antioxidant. A differential refractometer was used as a detector. Standard polystyrenes available from Tosoh Corporation were used as those of $Mw<1,000$ and $Mw>4\times10^6$, and standard polystyrenes available from Pressure Chemical Co. were used as those of $1,000<Mw<4\times10^6$.

(4) Crystallinity

The crystallinity was determined by subjecting a pressed sheet having a thickness of 1.0 mm to X-ray diffractometry after at least 24 hours had passed since the sheet was formed.

EXAMPLE 1

Using toluene as a reaction solvent, 50 g of ethylene/4-methyl-1-pentene copolymer (LLDPE-1, density: 0.920 g/cc, the ethylene content: 97 mole %, MFR (at 190° C.): 20.0 g/10 minutes, and crystallinity: 49.6%) in 170 ml of toluene was placed in a one-liter autoclave, and was dissolved at 140° C. under a nitrogen atmosphere. Next, to this polymer solution, a mixture of 5 g of glycidyl methacrylate and 5 g of styrene, and a toluene (40 ml) solution of dicumyl peroxide (1 g), each prepared beforehand, were added by dropping from separate inlet tubes over 4 hours. After the end of dropping, the reaction system was kept at the same temperature for additional 2 hours. After ending the reaction, the system was cooled to room temperature, then the resultant polymer solution in toluene was injected into 3 liters of acetone, and left for polymer precipitation. The precipitated polymer was filtered and repeatedly washed with acetone, subsequently was dried overnight under reduced pressure at 80° C., and the desired modified ethylenic copolymer was obtained.

Based on the elemental analysis and NMR spectroscopy of the prepared modified ethylenic copolymer, the grafted amount of glycidyl methacrylate was found to be 1.0% by weight and the grafted amount of styrene to be 1.3% by weight. A film was prepared from the produced modified ethylenic copolymer as described below, and the adhesive strength to the LC polymer was measured in the following manner.

The results are shown in Table 1.

[Preparation of Films]

On a press plate an aluminum sheet of 0.1 mm in thickness, a polyimide sheet, and an aluminum sheet of 100 μm in thickness whose center portion was cut out in a square of 20 cm×20 cm and removed were placed in this order, and in the center (where a portion of the sheet was cut out and removed) 4.0 g of the sample (the modified polymer) was placed. Next, this was covered with a polyimide sheet, an aluminum sheet and a press plate in this order.

The sample placed between the above press plates was put in a hot press at 190° C., preheated for about 5 min, and pressurizing (at 50 kg/cm$^2$-G) and depressurizing were repeated several times to remove bubbles in the sample. Next, the pressure was increased to 100 kg/cm$^2$-G and press-heated for 5 min. After depressurizing, the press plates were removed from the press and were then placed in a different press whose pressing surfaces were kept at 20° C., press-cooled at 100 kg/cm$^2$-G for 5 min, then depressurized, and the sample was taken out. A part of the so-prepared film (an adhesive resin sheet) whose thickness was found to be uniform from about 150 to 170 μm was used for measurement of the adhesive strength.

Except for the change of press temperature, a press sheet of the LC polymer (marketed product Vectran V300P, press temperature: 230° C.), and a press sheet of a high-density polyethylene (marketed product Hizex 7000F, press temperature: 190° C.) were prepared.

[Measurement of the Adhesive Strength to the LC Polymer]

The press sheets prepared as above were superposed in the order of the high-density polyethylene/the adhesive resin composition/the LC polymer, and a laminated body comprising three layers was prepared at the press temperature of 260° C., according to a procedure similar to [Preparation of films] described above. The laminated body thus obtained was cut in the form of long strips of 15 mm in width, and the tear strength was measured by tearing apart the adhesive interface between the LC polymer and the adhesive resin composition in the direction of 180° with a tear velocity of 300 mm/min.

The measurement of the adhesive strength after immersion in gasoline was performed in the following way.

The laminated body comprising the high-density polyethylene/the adhesive resin composition/the LC polymer was prepared according to a procedure similar to that used in the measurement of the adhesive strength as described above. The laminated body thus obtained was cut in the form of long strips of 15 mm in width, and was then immersed in standard gasoline (toluene/isooctane=50/50 mixture solution) at 40° C. for one week. After the end of immersion, a specimen taken out of the immersion bath was left for one day for conditioning of the state. Then the tear strength was measured according to the procedure similar to those described above.

EXAMPLES 2 TO 10, COMPARATIVE EXAMPLE 1 AND 2

Tests were carried out similarly to that of EXAMPLE 1 except that the test conditions were modified as described in Table 1. The results are shown in Table 1.

TABLE 1

| | Example 1 | Example 2 | Example 3 | Example 4 |
|---|---|---|---|---|
| Polyolefin (g) | LLDPE-1 50 | ← 50 | ← 50 | LLDPE-2 50 |
| Epoxy group containing ethylenically unsaturated monomer (g) | GMA 5 | ← 12.5 | ← 25 | ← 5 |
| Aromatic vinyl monomer (g) | St 5 | ← 12.5 | ← 25 | ← 5 |
| Radical initiator (g) | DCP 1 | ← 1 | ← 1 | ← 1 |
| Grafted amount (wt %) | GMA/St 1.0/1.3 | ← 2.4/2.3 | ← 4.0/4.2 | GMA/St 1.0/1.3 |
| Polymer adhesiveness to liquid crystal polymer (Kgf/15 mm) | | | | |
| Initial adhesive force | 2.6 | 3.4 | Base material fractured | 2.6 |
| After immersion in gasoline | 2.3 | 3.1 | Base material fractured | 2.0 |

| | Example 5 | Comparative Example 1 | Comparative Example 2 |
|---|---|---|---|
| Polyolefin (g) | EBR-1 50 | LLDPE-1 50 | EGMA |
| Epoxy group containing ethylenically unsaturated monomer (g) | GMA 5 | — | — |

TABLE 1-continued

| | | | |
|---|---|---|---|
| Aromatic vinyl monomer (g) | St 5 | — | — |
| Radical initiator (g) | DCP 1 | — | — |
| Grafted amount (wt %) | GMA/St 1.1/1.4 | — | — |
| Polymer adhesiveness to liquid crystal polymer (Kgf/15 mm) | | | |
| Initial adhesive force | 3.1 | 0.1 or less | Base material fractured |
| After immersion in gasoline | 0.5 | 0.1 or less | 1.0 |

| | Example 6 | Example 7 | Example 8 | Example 9 | Example 10 |
|---|---|---|---|---|---|
| Polyolefin (g) | LLDPE-1 50 | ← 50 | ← 50 | ← 50 | LLDPE-2 50 |
| Epoxy group containing ethylenically unsaturated monomer (g) | 3,4-epoxy-cyclo-hexyl-methyl-acrylate (ERA) 5 | ← 10 | ← 50 | 3,4-epoxy-cyclo-hexyl-methyl-acrylate 5 | 3,4-epoxy-cyclo-hexyl-methyl-acrylate 5 |
| Aromatic vinyl monomer (g) | — | — | St 50 | — | — |
| Radical initiator (g) | DCP 0.25 | ← 0.25 | ← 2 | ← 0.25 | ← 0.25 |
| Grafted amount (wt %) | 1.14 | 2.06 | ERA/St 3.1/3.5 | 0.20 | 1.10 |
| Polymer adhesiveness to liquid crystal polymer (Kgf/15 mm) | | | | | |
| Initial adhesive force | 2.5 | 3.3 | Base material fractured | 2.3 | 2.5 |
| After immersion in gasoline | 2.1 | 3.0 | Base material fractured | 2.0 | 2.2 |

Further, symbols and abbreviated notations of Table 1 are explained below.

DCP: dicumyl peroxide

LLDPE-1: ethylene/4-methyl-1-pentene copolymer (density: 0.920 g/cc, ethylene content: 97 mole %, MFR (190° C.): 20 g/10 minutes, and crystallinity: 49.6%)

LLDPE-2: ethylene/hexene copolymer (density: 0.905 g/cc, ethylene content: 95 mole %, MFR (190° C.): 20 g/10 minutes, and crystallinity: 35%)

EBR-1: ethylene/1-butene copolymer (density: 0.888 g/cc, ethylene content: 88 mole %, MFR (190° C.): 20 g/10 minutes, and crystallinity: 12%)

GMA: glycidyl methacrylate

St: styrene

EBR-1: ethylene/1-butene copolymer (density: 0.888 g/cc, ethylene content: 88 mole %, MFR (190° C.): 20 g/10 minutes, and crystallinity: 12%)

EGMA: ethylene/glycidyl methacrylate copolymer (ethylene content: 88 wt %)

[-] indicates "unused", and [←] indicates "the same compounds to the left was used".

INDUSTRIAL APPLICABILITY

The adhesive resin and the adhesive resin composition of the present invention have an excellent adhesiveness to the liquid crystal polymer and excellent solvent resistance.

The adhesive resin and the adhesive resin composition of the present invention are applicable as products of any shape if used as adhesive resins for multilayer structures including the liquid crystal polymer described above, and in particular used preferably as adhesive resins for multilayer films, multilayer sheet, multilayer blow molded articles, and multilayer injection molded articles wherein the polyolefin and the liquid crystal polymer are laminated.

These multilayer structures can be used as packaging materials for food packaging and pharmaceuticals packaging, and as containers such as automobile fuel tanks.

The invention claimed is:

1. An adhesive resin for a liquid crystal polymer comprising a modified polyolefin (D) prepared by craft polymerizing at least one epoxy group-containing ethylenically unsaturated monomer (B) to a polyolefin (A), wherein the modified polyolefin (D) is a modified polyolefin (D-1) formed by graft polymerizing a monomer consisting of 0.01 to 20% by weight of the epoxy group-containing ethylenically unsaturated monomer (B) except an alicyclic epoxy group-containing ethylenically unsaturated monomer represented by the following formulae (1) to (5) to the polyolefin (A) wherein the polyolefin (A) is an ethylene homopolymer (A-1) or a copolymer (A-2) of ethylene and at least one α-olefin selected from the group consisting of α-olefins having from 3 to 20 carbon atoms, the ethylene homopolymer (A-1) or the copolymer (A-2) having a density of 0.895 g/cc or more, and a melt flow rate (190° C. and a load of 2.16 kg) within the range of from 0.01 to 500 g/10 minutes:

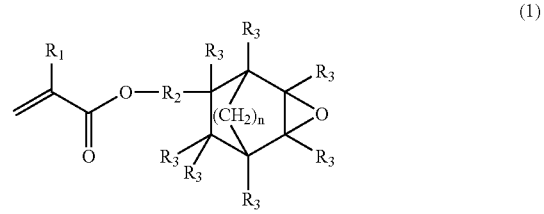

(1)

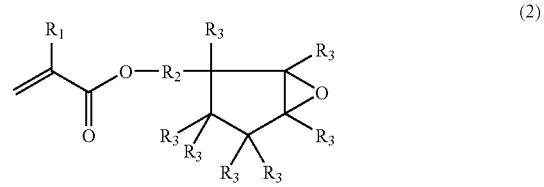

(2)

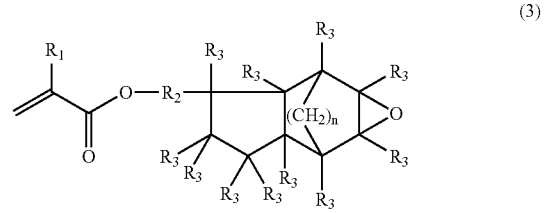

(3)

-continued (4)

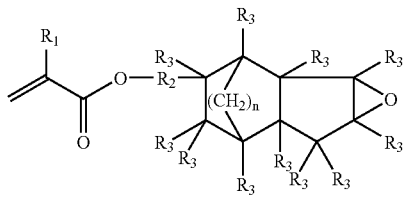

(5)

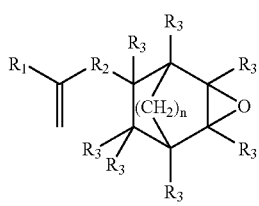

wherein $R_1$ is a hydrogen atom or a methyl group, $R_2$ is a single bond or a bivalent hydrocarbon group having from 1 to 20 carbon atoms and optionally containing hetero atoms, $R_3$ is a hydrogen atom or a hydrocarbon group having from 1 to 20 carbon atoms and optionally containing hetero atoms, and n is an integer of 0 to 2, with the proviso that $R_3$ may be all the same or different from each other.

2. An adhesive resin for a liquid crystal polymer comprising a modified polyolefin (D) prepared by graft polymerizing at least one epoxy group-containing ethylenically unsaturated monomer (B) to a polyolefin (A), wherein the modified polyolefin (D) is a modified polyolefin (d-1) formed by graft polymerizing monomers consisting of 0.01 to 20% by weight of the epoxy group-containing ethylenically unsaturated monomer (B) except an alicyclic epoxy group-containing ethylenically unsaturated monomer represented by the following formulae (1) to (5); and 0.01 to 20% by weight of an aromatic vinyl monomer (C) to the polyolefin (A) wherein the polyolefin (A) is an ethylene homopolymer (A-1) or a copolymer (A-2) of ethylene and at least one α-olefin selected from the group consisting of α-olefins having from 3 to 20 carbon atoms, the ethylene homopolymer (A-1) or the copolymer (A-2) having a density of 0.895 g/cc or more and a melt flow rate (190° C. and a load of 2.16 kg) within the range of from 0.01 to 500 g/10 minutes:

(1)

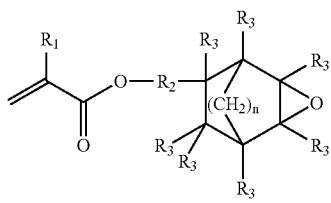

(2)

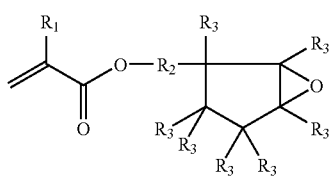

-continued (3)

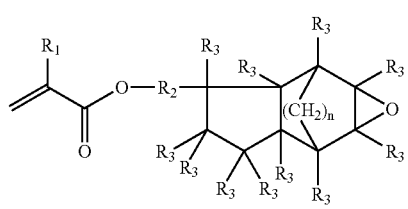

(4)

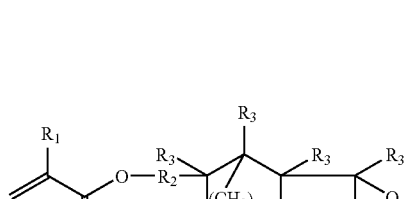

(5)

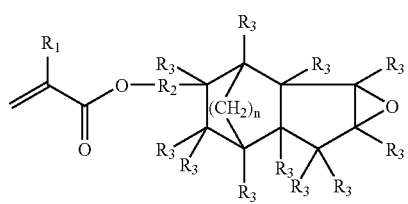

wherein $R_1$ is a hydrogen atom or a methyl group, $R_2$ is a single bond or a bivalent hydrocarbon group having from 1 to 20 carbon atoms and optionally containing hetero atoms, $R_3$ is a hydrogen atom or a hydrocarbon group having from 1 to 20 carbon atoms and optionally containing hetero atoms, and n is an integer of 0 to 2, with the proviso that $R_3$ may be all the same or different from each other.

3. The adhesive resin for the liquid crystal polymer according to claim 2, wherein the mole ratio of the grafted amount represented by (the epoxy group-containing ethylenically unsaturated monomer (B)) except an alicyclic epoxy group-containing ethylenically unsaturated monomer represented by the above formulae (1) to (5): (the aromatic vinyl monomer (C)) in the modified polyolefin (d-1) is in the range of from 10:90 to 95:5.

4. An adhesive resin for a liquid crystal polymer comprising a modified polyolefin (D) prepared by graft polymerizing at least one epoxy group-containing ethylenically unsaturated monomer (B) to a polyolefin (A), wherein the modified polyolefin (D) is a modified polyolefin (D-2) prepared by graft polymerizing an alicyclic epoxy group-containing ethylenically unsaturated monomer represented by the following formula (5) to a polyolefin (A) obtained by polymerizing one or more olefins selected from the group consisting of ethylene and α-olefins having from 3 to 20 carbon atoms, in an amount in the range of from 0.01 to 50% by weight, with the proviso that the modified polyolefin (D) is 100% by weight:

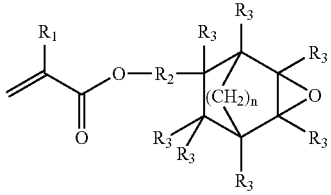

(1)

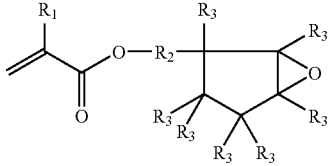

(2)

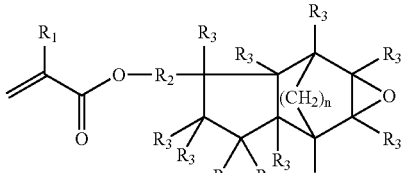

(3)

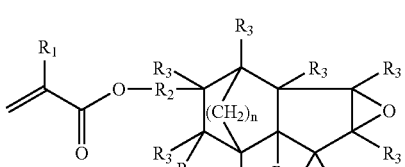

(4)

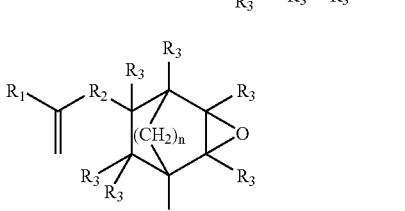

(5)

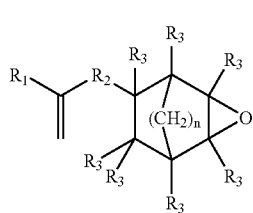

(5)

(wherein $R_1$ is a hydrogen atom or a methyl group, $R_2$ is a single bond or a bivalent hydrocarbon group having from 1 to 20 carbon atoms and optionally containing hetero atoms, $R_3$ is a hydrogen atom or a hydrocarbon group having from 1 to 20 carbon atoms and optionally containing hetero atoms, and n is an integer of 0 to 2, with the proviso that $R_3$ may be all the same or different from each other).

5. The adhesive resin for the liquid crystal polymer according to claim 4, wherein the resin comprises the modified polyolefin (D-2) prepared by graft polymerizing the alicyclic epoxy group-containing ethylenically unsaturated monomer (B) represented by the above formula (5) in the range of from 0.01 to 50% by weight, and the other ethylenically unsaturated monomer in the range of from 0.01 to 50% by weight to a polyolefin (A) obtained by polymerizing one or more olefins selected from the group consisting of ethylene and α-olefins having from 3 to 20 carbon atoms, with the proviso that the modified polyolefin is 100% by weight and the total grafted amount of (B) and the other ethylenically unsaturated monomer is in the range of from 0.02 to 60% by weight.

6. The adhesive resin for the liquid crystal polymer according to claim 4, wherein the polyolefin (A) is an ethylene homopolymer or an ethylenic copolymer.

7. The adhesive resin for the liquid crystal polymer according to claim 4, wherein the polyolefin (A) is the ethylene homopolymer or the ethylenic copolymer having a density of 0.895 g/cc or more.

8. The adhesive resin for the liquid crystal polymer according to claim 5, wherein the other ethylenically unsaturated monomer is an aromatic vinyl monomer.

9. An adhesive resin composition for a liquid crystal polymer, comprising a modified polyolefin (D) prepared by graft polymerizing at least one epoxy group-containing ethylenically unsaturated monomer (B) to a polyolefin (A), wherein the modified polyolefin (D) is a modified polyolefin (D-1) formed by graft polymerizing a monomer consisting of 0.01 to 20% by weight of the epoxy group-containing ethylenically unsaturated monomer (B) except an alicyclic epoxy group-containing ethylenically unsaturated monomer represented by the following formulae (1) to (5) to the polyolefin (A) wherein the polyolefin (A) is an ethylene homopolymer (A-1) or a copolymer (A-2) of ethylene and at least one α-olefin selected from the group consisting of α-olefins having from 3 to 20 carbon atoms, the ethylene homopolymer (A-1) or the copolymer (A-2) having a density of 0.895 g/cc or more, and a melt flow rate (190° C and a load of 2.16 kg) within the range of from 0.01 to 500 g/10 minutes:

wherein $R_1$ is a hydrogen atom or a methyl group, $R_2$ is a single bond or a bivalent hydrocarbon group having from 1 to 20 carbon atoms and optionally containing hetero atoms, $R_3$ is a hydrogen atom or a hydrocarbon group having from 1 to 20 carbon atoms and optionally containing hetero atoms, and n is an integer of 0 to 2, with the proviso that $R_3$ may be all the same or different from each other, and a thermoplastic resin (E).

10. The adhesive resin composition for the liquid crystal polymer according to claim 9, wherein the thermoplastic resin (E) is a polyolefin.

11. The adhesive resin composition for the liquid crystal polymer according to claim 9, wherein the thermoplastic resin (E) is at least one ethylenic polymer selected from the group consisting of an ethylene homopolymer and a copolymer of ethylene and at least one α-olefin having from 3 to 20 carbon atoms.

12. The adhesive resin composition for the liquid crystal polymer according to claim 9, wherein the modified polyolefin (D) is contained in the range of from 1 to 90% by weight.

* * * * *